H. G. GILLMOR.
MEANS OF FORMING RAIL JOINTS.
APPLICATION FILED APR. 16, 1906.
970,810.
Patented Sept. 20, 1910.
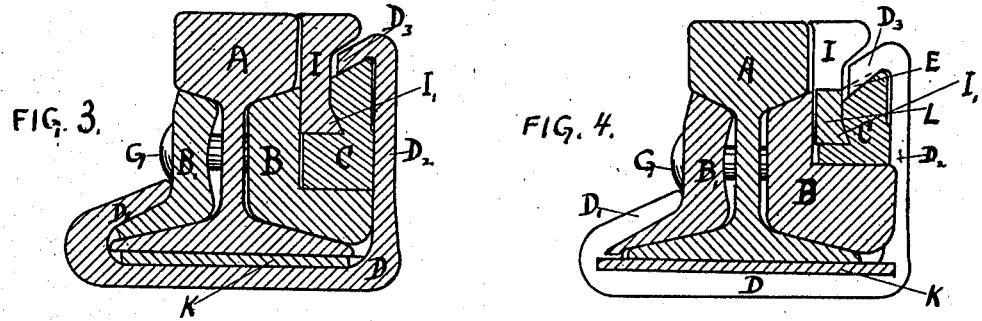
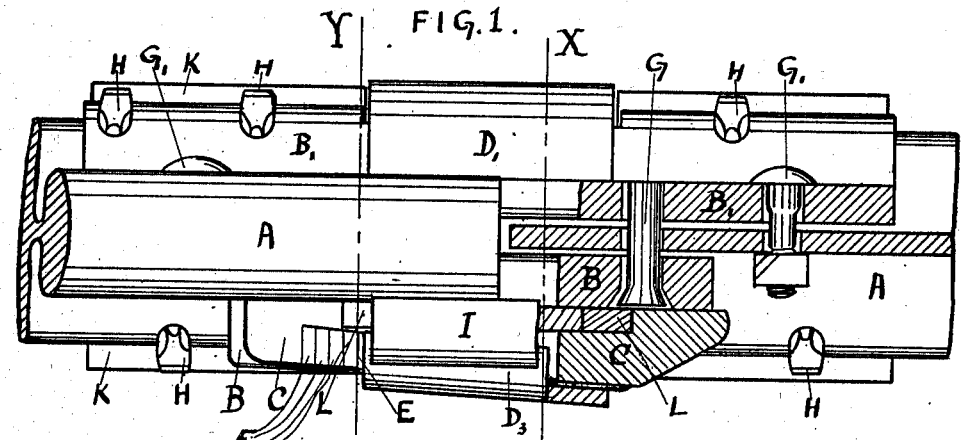
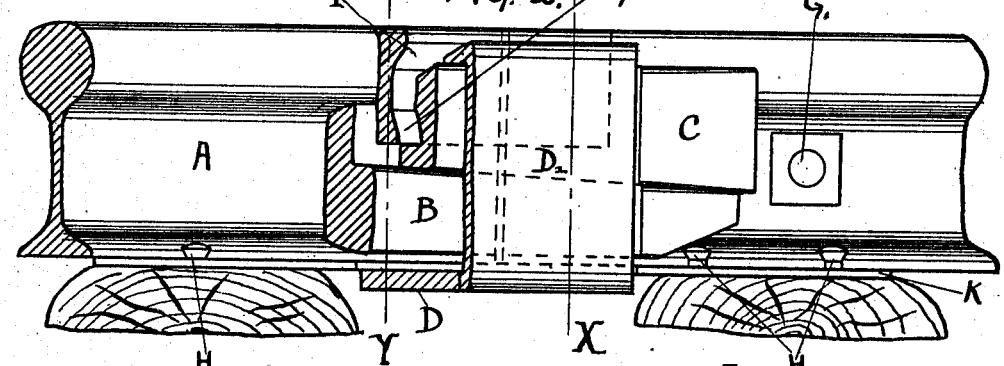
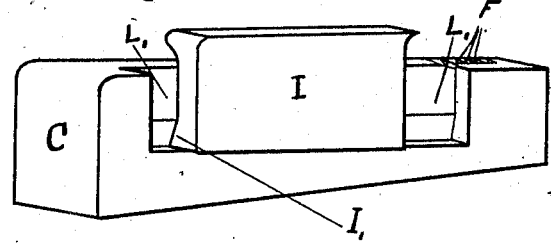
Witnesses
H. H. Bonnemat
H. E. Williams.
Inventor
H. G. Gillmor

UNITED STATES PATENT OFFICE.

HORATIO G. GILLMOR, OF BATH, MAINE, ASSIGNOR TO CHARLES A. PRICE, OF QUINCY, MASSACHUSETTS.

MEANS OF FORMING RAIL-JOINTS.

970,810.  Specification of Letters Patent.  Patented Sept. 20, 1910.

Application filed April 16, 1906. Serial No. 311,931.

*To all whom it may concern:*

Be it known that I, HORATIO G. GILLMOR, a citizen of the United States, residing at Bath, county of Sagadahoc, State of Maine, have invented an Improvement in the Means of Forming Rail-Joints, of which the following is a specification accompanied by drawings.

This invention relates to railway joints, although the uses of the means employed to form the rail joints are not limited to such joints, for my invention may be used in any connection in which they may be found applicable.

One object of my invention is to provide an efficient means of joining rails free from parts which may work loose after once having been properly placed.

Another object of my invention is to prevent hammering of the rail ends at the joint by providing a continuous tread for the wheels, and efficiently supporting the rails at the joint.

Another object of my invention is to produce a joint which may be employed with rails the ends of which at the joint have been deformed in service, and still provide a smooth and continuous tread for the wheels.

Further objects of my invention will hereinafter appear; and, to these ends, the invention consists of a rail joint for carrying out the above objects, embodying the features of construction, combination of elements and arrangement of parts having the general mode of operation, as hereinafter described and claimed in this specification, and shown in the accompanying drawings, in which:—

Figures 1 and 2 are, respectively, a plan view and an elevation, both partly in section, illustrating the rail joint. Figs. 3 and 4 are sections of the parts at the plane indicated by X X and Y Y in Figs. 1 and 2. Fig. 5 is a perspective view of the adjustable bridge and wedge used in forming the joint.

Similar letters refer to similar parts throughout the several views.

Referring to the drawings, A represents the meeting ends of the rails resting upon a base plate K, notched to interlock with a clamp or chair D, formed with an overturned arm $D_1$ constructed to engage with a fish bar $B_1$ of the ordinary type, and a rising arm $D_2$, between which and the rail, is driven a wedged fish bar B.

B is formed with one surface a plane inclined at an angle to the plane of the base of the chair; and, between B and the overturned flange $D_3$ at the upper edge of the rising arm, there is driven a second wedge C. Near the small end of this wedge there are several catch teeth F the upper edges of which are about in the plane of the upper surface of the wedge, and $D_3$ is formed with a complementary projection. As C is driven to position between B and $D_3$ the latter springs sufficiently to permit the wedge to be driven by the catch, and, so soon as the proper position is reached, a tooth of the wedge will automatically interlock with the catch projection on $D_3$ at E, thereby locking the wedge in position, and preventing slackening.

The driving of the wedged fish bar B between the chair D and the rails, at one side of the rails, exerts a pressure upon the chair and draws the fish bar $B_1$, at the opposite side of the rails, into position. The arm $D_1$ is given such a form that, as the fish bar $B_1$ is drawn into position by the driving of B, a vertical pressure is exerted by the chair upon the fish bar flange and the base of the rails. The driving of the wedge C brings vertical pressure upon B and D. Pressure is therefore exerted upon all of the bearing surfaces, they are brought into intimate contact with one another, and an upward pressure under the heads and lower surfaces of the bases of the rails, and a downward pressure upon the upper surfaces of the bases of the rails, are produced.

To provide against creeping of the rails B and $B_1$ the rails are provided with holes, and when B has been driven into position with its holes in line with those of the rails and $B_1$, a pin G is inserted as shown. G may be formed with some taper so that it may be entered and driven into place even when the holes do not exactly correspond. The extended ends of the fish bar may be secured by the usual bolts and nuts $G_1$ as shown. G and $G_1$ serve to secure the parts of the joint to one rail; and, by forming the base plate K with holes for the usual spikes H, those on one side of the rails registering with notches in the flanges of the fish bar, this flange being further notched as shown in Fig. 1 to interlock with the chair D, the joint parts and one rail are securely held while the other is left free to the small movements necessary to the adjustment of the rails under changes in temperature.

For exposed rails it is necessary that some opening be left at each joint between the two rails meeting at the joint to allow for changes in length of the rails on account of the expansion and contraction at the varying temperatures. The distance of the rail ends apart at the joint will depend upon the temperature of the rails and will be greater in cold weather than in warm.

The tread of the wheels usually employed upon railway rolling stock is greater in width than the tread of the rails. To provide a continuous rail tread at the joint, I arrange for a bridge I. This bridge may be given a variety of forms and may be secured in a number of ways, preferably by utilizing the wedge C for this purpose. To this end the wedge C is formed with a recess as shown in Fig. 5. To hold the bridge I securely in position, it is formed at one edge with a projection $I_1$ and the recess in C is given a complementary form.

The bottom of the wedge C is inclined upwardly, and the recess in which the bridge I rests is parallel to the upper face of C, so that, as the wedge C is driven into position, the top of I will be moved vertically in relation to the rail treads an amount depending upon the inclination of the lower face of C and the distance through which C is moved horizontally in driving it into position.

By making I shorter than the recess formed in C so that it may be moved longitudinally with respect to C, it is possible to arrange for considerable adjustment in the height of I with respect to the rail tread while retaining its middle at about the opening of the joint; and, in this way, by suitably placing I with respect to C and driving C to position, the upper surface of I may be brought to correspond with the rail tread. In this position the wedge C will hold I with the projection $I_1$ in engagement with the recess in C, and by inserting the keys L in the spaces $L_1$ in the recess in C beyond the ends of I, it will be held securely in position.

As a wheel in passing over the joint reaches the opening between the rails, the outer edge of the wheel tread not ordinarily in contact with the rail tread will come upon the upper face of I, and I will provide a bridge for the opening at the joint so that the wheel will find practically a continuous rail tread at the joint.

The bridge I and wedge C might be combined in one piece instead of being made separately as here shown. By making them separately, however, and securing I in the manner described, it is possible to make I of a uniform section so that ordinary rolled material may be used for the purpose while the wedges employed may be made in cast material. This arrangement makes it possible to conveniently renew the bridge at a minimum of cost. The making of the bridge and wedges separately has the further advantage that a considerable adjustment of height of the bridge is possible, so that a corresponding wear of the surface of the bridge may be adjusted for from time to time.

It will be readily understood that by setting all of the parts of this joint, including the bridge, in metal introduced in a molten condition in the manner described in my application Serial Number 300,667, filed February 12, 1906, great rigidity of the joint may be secured.

Where rail joints of the ordinary bolted fish bar type have received insufficient care and attention, and the bolts have been allowed to slacken, the ends of the rails at the joint quickly become deformed by the hammering of the wheels as they pass from one rail to the next. My rail joint is well adapted to application to such damaged rails even where the rail ends have been badly hammered. The wedging action of B and C draw the parts of the joint into contact and bring pressure upon the lower side of the heads and bases of the rails and the tops of the flanges of the rails to form a rigid joint and the bridge piece when adjusted to aline with the plane of the rails beyond the hammered ends corrects what would otherwise be a low joint, and gives a continuous rail tread at a level corresponding to that of a uniform middle portion of the rails.

It will be readily understood that the two wedges employed might be combined in a single wedge and still serve the purpose which the two here employed serve, and that these wedges and the bridge might be formed in one piece instead of being formed separately.

Obviously some features of this invention may be used without others and the invention may be embodied in widely varying forms. Therefore, without limiting the invention to the construction shown and described, nor enumerating equivalents,

I claim and desire to secure by Letters Patent the following:—

1. A self locking wedge clamp comprising a clamp body with suitably formed arms extending upwardly and inwardly and a self locking wedge constructed with wedging surfaces to engage with the clamp body and other bodies to secure pressure between the clamp and said bodies, the said wedge being constructed with a plurality of catches any one of which is adapted to engage with suitably formed surfaces of an arm of said clamp body to prevent slackening of the wedge when driven into position.

2. A self locking wedge clamp comprising a clamp body with suitably formed arms extending upwardly, one of the said arms being overturned inwardly at its upper edge and a self locking wedge clamp constructed to exert wedging forces in two directions approximately at right angles between the said clamp and other bodies, said wedge being constructed with a plurality of catches any one of which is adapted to engage with suitably formed surfaces of an arm of the said clamp body to prevent slackening of the wedge when driven into position.

3. A self locking wedge clamp comprising a clamp body with suitably formed arms extending upwardly and inwardly and self locking wedges constructed with wedging surfaces to engage with the clamp body and other bodies to secure pressure between the said clamp and said bodies, one of the said wedges being constructed with a plurality of catches any one of which is adapted to engage with suitably formed surfaces of an arm of the said clamp body to prevent slackening of the wedges when driven into position, for substantially the purposes set forth.

4. A self locking wedge clamp comprising a clamp body with suitably formed, upwardly extending arms, one of the said arms being overturned inwardly at its upper edge; and wedges constructed to engage with each other, the clamp body and other bodies to exert wedging forces between the clamp and said other bodies in two directions approximately at right angles, one of the said wedges being constructed with a plurality of catches any one of which is adapted so to engage with suitably formed surfaces of an arm of said clamp body as to prevent slackening of the wedges when driven into position; for substantially the purposes set forth.

5. A rail joint comprising the rails, a clamp body or chair having upwardly projecting arms, a wedge constructed to exert wedging forces between the said clamp body or chair and other parts of the joint and provided with a plurality of catches, any one of which is adapted so to engage with suitably formed surfaces upon an arm of the said clamp body or chair as to prevent slackening of the wedge when driven into position, for substantially the purposes set forth.

6. A rail joint comprising the rails, a clamp body or chair having upwardly extending arms, one of the said arms being overturned inwardly at its upper edge, and wedges constructed to engage with each other, the clamp body or chair and other parts of the joint, to exert wedging forces between the said clamp body or chair and other parts of the joint in two directions approximately at right angles, one of the said wedges being constructed with a plurality of catches any one of which is adapted so to engage with suitably formed surfaces of an arm of the said chair as to prevent slackening of the wedges when driven into position, for substantially the purposes set forth.

7. A rail joint comprising the rails, a base plate, a chair having upwardly projecting arms interlocking with the said base plate, and a wedge constructed to exert wedging forces between said clamp body or chair and other parts of the joint and provided with a plurality of catches any one of which is adapted so to engage with suitably formed surfaces upon an arm of the said clamp body or chair as to prevent slackening of the wedge when driven into position, for substantially the purposes set forth.

8. A rail joint comprising the rails, a base plate, a clamp body or chair, having upwardly extending arms interlocking with said base plate, one of the said arms being overturned inwardly at its upper edge, and wedges constructed to engage with each other, the clamp body or chair and other parts of the joint to exert wedging forces between the said clamp body or chair and other parts of the joint in two directions approximately at right angles, one of said wedges being constructed with a plurality of catches any one of which is adapted so to engage with suitably formed surfaces of an arm of the said chair as to prevent slackening of the wedges when driven into position, for substantially the purposes set forth.

9. A rail joint comprising the rails, a fish bar, a clamp body or chair having upwardly projecting arms and a wedge constructed to exert wedging forces between the said clamp body or chair and other parts of the joint and provided with a plurality of catches any one of which is adapted so to engage with suitably formed surfaces upon an arm of the said clamp body or chair as to prevent slackening of the wedge when driven into position, for substantially the purposes set forth.

10. A rail joint comprising the rails, a fish bar, a chair having upwardly extending arms, one of the said arms being constructed to engage with the fish bar at one side of the joint and the other of the said arms being overturned inwardly at its upper edge, and wedges, constructed to exert wedging forces in two directions approximately at right angles between the said clamp body or chair and other parts of the joint at the side of the rails opposite to the said fish bar, for substantially the purposes set forth.

11. A rail joint comprising the rails, a fish bar, a chair having upwardly extending arms, one of the said arms being constructed to engage with the fish bar at one side of the joint, the other of the said arms being overturned inwardly at its upper edge, wedges constructed to exert wedging forces in two directions approximately at right angles between the said chair and other parts of the joint at the side of the rails opposite to the said fish bar, means to prevent relative movement of one rail with respect to the said fish bar and chair and means for securing the said chair to the ties or sleepers for substantially the purposes set forth.

12. A rail joint comprising the rails, a fish bar, a clamp body or chair, and a wedge constructed to exert wedging forces between the said clamp body or chair and other parts of the joint and provided with a plurality of catches any one of which is adapted so to engage with suitably formed surfaces upon an arm of the said clamp body or chair as to prevent slackening of the wedge when driven into position, for substantially the purposes set forth.

13. A rail joint comprising the rails, a fish bar, a clamp body or chair having upwardly projecting arms, one of said arms being overturned inwardly at its upper edge and wedges constructed to engage with each other, the clamp body or chair and other parts of the joint to exert wedging forces between the said clamp body or chair and other parts of the joint in two directions approximately at right angles, one of the said wedges being constructed with a plurality of catches any one of which is adapted so to engage with suitably formed surfaces of an arm of the said clamp body or chair as to prevent slackening of the wedges when driven into position, for substantially the purposes set forth.

14. A rail joint comprising the rails, a fish bar, a base plate, a clamp body or chair having upwardly extending arms interlocking with said base plate, and a wedge constructed to exert wedging forces between said clamp body or chair and other parts of the joint and provided with a plurality of catches any one of which is adapted to engage with suitably formed surfaces upon an arm of the said clamp body or chair to prevent slackening of the wedge when driven into position, for substantially the purposes set forth.

15. A rail joint comprising the rails; a fish bar; a base plate; a clamp body or chair having upwardly extending arms interlocking with the said base plate, one of the said arms being constructed to engage with said fish bar at one side of the joint and the other of the said arms being overturned inwardly at its upper edge; and wedges constructed to exert wedging forces in two directions approximately at right angles between the said clamp body or chair and other parts of the joint at the side of the rails opposite to the said fish bar; for substantially the purposes set forth.

16. A rail joint comprising the rails; a fish bar; a chair, comprising a base and two upwardly extending arms, one of the said arms being constructed to engage with the fish bar and the other of the said arms being constructed with an inwardly projecting flange; wedges, constructed to engage with the rails, the chair and each other to secure an upward pressure of the parts of the joint under the heads and the lower surfaces of the bases of the rails, and a downward pressure of the parts of the joint upon the upper surfaces of the bases of the rails; means to prevent movement of the wedges with respect to each other and the other parts of the joint; means to prevent longitudinal movement of one rail with respect to the fish bar, chair and wedges; and a base plate, interlocking with the chair, extending transversely for a portion of its length beyond the bases of the rails and provided with spiking apertures; for substantially the purposes set forth.

17. A rail joint comprising the rails, a fish bar, a base plate; a chair having upwardly projecting arms interlocking with the said base plate, and a wedge, constructed to exert wedging forces between the said clamp body or chair and other parts of the joint and provided with a plurality of catches any one of which is adapted so to engage with suitably formed surfaces of an arm of said clamp body or chair as to prevent slackening of the wedge when driven into position, for substantially the purposes set forth.

18. A rail joint comprising the rails; a fish bar; a base plate; a clamp body or chair having upwardly extending arms interlocking with the said base plate, one of said arms being constructed to engage with the fish bar at one side of the joint and the other of the said arms being overturned inwardly at its upper edge; and wedges constructed to exert wedging forces in two directions approximately at right angles between the said clamp body or chair and other parts of the joint at the side of the rails opposite to the said fish bar; for substantially the purposes set forth.

19. A rail joint; comprising the rails; fish bars; a chair, comprising a base and two upwardly extending arms, one of the said arms being constructed to engage with a fish bar, and the other of the said arms being constructed with an inwardly projecting flange; wedges, constructed to engage with the chair, other parts of the joint and each other to secure an upward pressure of the parts of the joint under the heads and lower surfaces of the bases of the rails, and a downward pressure of the parts of the joint upon the upper surfaces of the bases of the rails; means to prevent movement of the wedges with respect to each other and the other parts of the joint; means to prevent longitudinal movement of one rail with respect to the fish bars and chair; and a base plate, interlocking with the chair, extending transversely for a portion of its length beyond the edges of the bases of the rails and provided with spiking apertures; for substantially the purposes set forth.

20. A rail joint; comprising the rails; fish bars, having flanges extending beyond the edges of the bases of the rails, provided with spiking apertures in said projecting flanges, a chair, comprising a base and two arms extending upwardly and inwardly, one of the said arms being constructed to engage with a fish bar and the other of the said arms being constructed with an inwardly projecting flange; wedges, constructed to engage with the chair, other parts of the joint and each other to secure an upward pressure of the parts of the joint under the heads and lower surfaces of the bases of the rails, and a downward pressure of the parts of the joint upon the upper surfaces of the bases of the rails; means to prevent movement of the wedges with respect to each other and the other parts of the joint; means to prevent longitudinal movement of one rail with respect to the fish bars and chair; a base plate, interlocking with the chair, extending transversely for a portion of its length beyond the edges of the bases of the rails and provided with spiking apertures coöperating with the spiking apertures in the flanges of the fish bar; and spikes traversing the coöperating apertures of the fish bar and base plate; for substantially the purposes set forth.

21. A rail joint; comprising the rails; fish bars, having flanges projecting beyond the edges of the bases of the rails, provided with spiking apertures in said projecting flanges; a chair comprising a base, having spiking apertures coöperating with the spiking apertures in the flanges of the fish bars, and two upwardly extending arms, one of the said arms being constructed to engage with a fish bar and the other of the said arms being constructed with an inwardly projecting flange; wedges, constructed to engage with the chair, other parts of the joint and each other to secure upward pressure of the parts of the joint under the heads and the lower surfaces of the bases of the rails and a downward pressure of the parts of the joint upon the upper surfaces of the bases of the rails; means to prevent movement of the wedges with respect to each other and the other parts of the joint; means to prevent longitudinal movement of one rail with respect to the fish bars and chair; and spikes traversing the coöperating apertures in the fish bars and base plate; for substantially the purposes set forth.

22. A rail joint, comprising the rails; a chair, comprising a base and upwardly extending arms supporting the rail ends; and a bridge piece constructed to overlap the rail ends and have wedging surfaces adapted to engage with an arm of the chair and other parts of the joint in such manner as to secure the said bridge piece in position with its upper surface in such relation to the treads of the rails as to provide in conjunction with the rails a continuous tread at the joint; for substantially the purposes set forth.

23. A rail joint; comprising the rails; a chair, comprising a base and upwardly extending arms supporting the rail ends; and an adjustable bridge piece, constructed to overlap the rail ends and be supported by the rail bases and chair in such manner that the height of its upper surface may be adjusted in such relation to the treads of the rails as to provide, in conjunction with the rails, a continuous tread at the joint; for substantially the purposes set forth.

24. A rail joint; comprising the rails; a chair, comprising a base and arms extending upwardly and inwardly, supporting the rail ends; a bridge piece, constructed to overlap the rail ends and be supported with its upper surface in such relation to the rail treads as to form with the rails a continuous tread at the joint; and a wedge, constructed to engage with the chair and the bridge piece to retain the parts in position; for substantially the purposes set forth.

25. A rail joint; comprising the rails; a chair, comprising a base and arms extending upwardly and inwardly, supporting the rail ends; an adjustable bridge piece, constructed to overlap the rail ends and be supported in such manner that the height of its upper surface may be adjusted in such relation to the rail treads as to form with the rails a continuous tread at the joint; and a wedge, provided with a recess of greater length than and adapted to receive said bridge piece, constructed to engage with the chair and bridge piece in such manner as to retain the parts in position; for substantially the purposes set forth.

26. A rail joint; comprising the rails; a chair, comprising a base and arms extending upwardly and inwardly, supporting the rail ends; an adjustable bridge piece, constructed to overlap the rail ends and be supported in such manner that the height of its upper surface may be adjusted in such relation to the rail treads as to form with them a continuous tread at the joint; a wedge, provided with a recess of greater length than and adapted to receive said bridge piece, constructed to engage with the chair and bridge piece in such manner as to retain the parts in position; means to prevent longitudinal movement of said bridge piece with respect to the wedge after adjustment; and means to prevent movement of the wedge with respect to the chair and rails; for substantially the purposes set forth.

27. A rail joint, comprising the rails; a chair, comprising a base and arms extending upwardly and inwardly, supporting the rail ends; a bridge piece, of substantially uniform section, constructed to overlap the rail ends and be supported with its upper surface in such relation to the rail treads as to form with the rails a continuous tread at the joint; and a wedge, constructed to engage with the chair and bridge piece to retain the parts in position; for substantially the purposes set forth.

28. A rail joint; comprising the rails; a chair, comprising a base and arms extending upwardly and inwardly, supporting the rail ends; an adjustable bridge piece, of substantially uniform section, constructed to overlap the rail ends and be supported in such manner that the height of its upper surface may be adjusted in such relation to the rail treads as to form with the rails a continuous tread at the joint; and a wedge, provided with a recess of greater length than and adapted to receive said bridge piece, constructed to engage with the chair and bridge piece in such manner as to retain the parts in position; for substantially the purposes set forth.

29. A rail joint; comprising the rails; a chair, comprising a base and arms extending upwardly and inwardly, supporting the rail ends; an adjustable bridge piece, of substantially uniform section, constructed to overlap the rail ends and be supported in such manner that the height of its upper surface may be adjusted in such relation to the rail treads as to form with them a continuous tread at the joint; a wedge, provided with a recess of greater length than and adapted to receive said bridge piece, constructed to engage with the chair and bridge piece in such manner as to retain the parts in position; means to prevent longitudinal movement of said bridge piece with respect to the wedge after adjustment; and means to prevent movement of the wedge with respect to the chair and rails; for substantially the purposes set forth.

30. A rail joint; comprising the rails; a chair, comprising a base and arms extending upwardly and inwardly, supporting the rail ends; a bridge piece, constructed to overlap the rail ends and be supported with its upper face in such relation to the rail treads as to form with the rails a continuous tread at the joint; a fish bar; and a wedge constructed to engage with the chair, bridge piece and other parts of the joint in such manner as to retain the parts in position; for substantially the purposes set forth.

31. A rail joint comprising the rails; a chair, comprising a base and arms extending upwardly and inwardly, supporting the rail ends; an adjustable bridge piece constructed to overlap the rail ends and be supported in such manner that the height of its upper surface may be adjusted in such relation to the rail treads as to form with the rails a continuous tread at the joint; a fish bar; and a wedge, provided with a recess of greater length than and adapted to receive said bridge piece, constructed to engage with the chair, bridge piece and other parts of the joint in such manner as to retain the parts in position; for substantially the purposes set forth.

32. A rail joint; comprising the rails; a chair comprising a base and arms extending upwardly and inwardly supporting the rail ends; an adjustable bridge piece constructed to overlap the rail ends and be supported in such manner that the height of its upper surface may be adjusted in such relation to the rail treads as to form with the rails a continuous tread at the joint; a fish bar; and a wedge, provided with a recess of greater length than and adapted to receive said bridge piece, constructed to engage with the chair, bridge piece and other parts of the joint in such manner as to retain the parts in position; means to prevent movement of said bridge piece with respect to said wedge after adjustment; and means to prevent movement of said wedge with respect to the other parts of the joint; for substantially the purposes set forth.

33. A rail joint; comprising the rails; a chair, comprising a base and arms extending upwardly and inwardly, supporting the rail ends; a bridge piece, of substantially uniform section, constructed to overlap the rail ends and be supported with its upper face in such relation to the rail treads as to form with the rails a continuous tread at the joint; a fish bar; and a wedge constructed to engage with the chair, bridge piece and other parts of the joint in such manner as to retain the parts in position, for substantially the purposes set forth.

34. A rail joint; comprising the rails; a chair, comprising a base and arms extending upwardly and inwardly, supporting the rail ends; an adjustable bridge piece, of substantially uniform section, constructed to overlap the rail ends and be supported in such manner that the height of its upper surface may be adjusted in such relation to the rail treads as to form with the rails a continuous tread at the joint; a fish bar; and a wedge, provided with a recess of greater length than and adapted to receive said bridge piece, constructed to engage with the chair, bridge piece and other parts of the joint in such manner as to retain the parts in position; for substantially the purposes set forth.

35. A rail joint; comprising the rails; a chair, comprising a base and arms extending upwardly and inwardly, supporting the rail ends; an adjustable bridge piece, of substantially uniform section, constructed to overlap the rail ends and be supported in such manner that the height of its upper surface may be adjusted in such relation to the rail treads as to form with the rails a continuous tread at the joint; a fish bar; and a wedge, provided with a recess of greater length than and adapted to receive said bridge piece, constructed to engage with the chair, bridge piece and other parts of the joint in such manner as to retain the parts in position; means to prevent movement of said bridge piece with respect to said wedge after adjustment; and means to prevent movement of said wedge with respect to the chair and other parts of the joint; for substantially the purposes set forth.

36. A rail joint; comprising the rails; a chair, comprising a base and two arms extending upwardly and inwardly, supporting the rail ends; a bridge piece, constructed to overlap the rail ends and be supported with its upper face in such relation to the rail treads as to form with the rails a continuous tread at the joint; and wedges constructed to engage with the rails, bridge piece and chair in such manner as to secure the bridge piece in position and provide an upward pressure of the parts of the joint under the heads and the lower surfaces of the bases of the rails and a downward pressure of the parts of the joint upon the upper surfaces of the bases of the rails; for substantially the purposes set forth.

37. A rail joint; comprising the rails; a chair, comprising a base and arms extending upwardly and inwardly, supporting the rail ends; an adjustable bridge piece, constructed to overlap the rail ends and be supported in such manner that the height of its upper surface may be adjusted in such relation to the rail treads as to form with the rails a continuous tread at the joint; and wedges constructed to engage with the rails, bridge piece and chair in such manner as to secure the bridge piece in position and provide an upward pressure of the parts of the joint under the heads ,and lower surfaces of the bases of the rails and a downward pressure of the parts of the joint upon the upper surfaces of the bases of the rails, one of the said wedges being formed with a recess of greater length than and adapted to receive said bridge piece; for substantially the purposes set forth.

38. A rail joint; comprising the rails; a chair, comprising a base and arms extending upwardly and inwardly, supporting the rail ends; an adjustable bridge piece, constructed to overlap the rail ends and be supported in such manner that the height of its upper surface may be adjusted in such relation to the rail treads as to form with the rails a continuous tread at the joint; wedges, constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails, one of said wedges being formed with a recess of greater length than and adapted to receive said bridge piece; means to prevent movement of said bridge piece with respect to said wedge after adjustment; and means to prevent movement of said wedges with respect to the chair and other parts of the joint; for substantially the purposes set forth.

39. A rail joint; comprising the rails; a chair, comprising a base and arms extending upwardly and inwardly, supporting the rail ends; an adjustable bridge, constructed to overlap the rail ends and be supported in such manner that the height of its upper surface may be adjusted in such relation to the rail treads as to form with the rails a continuous tread at the joint; wedges constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails, one of said wedges being formed with a recess of greater length than and adapted to receive said bridge piece; for substantially the purposes set forth.

40. A rail joint; comprising the rails; a chair, comprising a base and arms extending upwardly and inwardly, supporting the rail ends; a bridge piece, of substantially uniform section, constructed to overlap the rail ends and be supported with its upper face in such relation to the rail treads as to form with the rails a continuous tread at the joint; wedges, constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails; for substantially the purposes set forth.

41. A rail joint; comprising the rails; a chair, comprising a base and arms extending upwardly and inwardly, supporting the rail ends; an adjustable bridge piece, of substantially uniform section, constructed to overlap the rail ends and be supported in such manner that the height of its upper surface may be adjusted in such relation to the rail treads as to form with the rails a continuous tread at the joint; wedges, constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails, one of said wedges being formed with a recess of greater length than and adapted to receive said bridge piece; means to prevent movement of said bridge piece with respect to said wedge after adjustment; and means to prevent movement of the wedges with respect to the chair and other parts of the joint; for substantially the purposes set forth.

42. A rail joint; comprising the rails; a fish bar; a chair, comprising a base and arms extending upwardly and inwardly, supporting the rail ends; a bridge piece, constructed to overlap the rail ends and be supported with its upper face in such relation to the rail treads as to form with the rails a continuous tread at the joint; and wedges, constructed to engage with the rails, bridge piece and chair in such manner as to secure the bridge piece in position and provide an upward pressure of the parts of the joint under the heads and the lower surfaces of the bases of the rails and a downward pressure of the parts of the joint upon the upper surfaces of the bases of the rails; for substantially the purposes set forth.

43. A rail joint; comprising the rails; a fish bar; a chair, comprising a base and arms extending upwardly and inwardly supporting the rail ends; an adjustable bridge piece, constructed to overlap the rail ends and be supported in such manner that the height of its upper surface may be adjusted in such relation to the rail treads as to form with the rails a continuous tread at the joint; and wedges constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails; one of the said wedges being formed with a recess of greater length than and adapted to receive said bridge piece; for substantially the purposes set forth.

44. A rail joint; comprising the rails; a fish bar; a chair, comprising a base and arms extending upwardly and inwardly supporting the rail ends; an adjustable bridge piece, constructed to overlap the rail ends and be supported in such manner that the height of its upper surface may be adjusted in such relation to the rail treads as to form with the rails a continuous tread at the joint; wedges, constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails; one of the said wedges being formed with a recess of greater length than and adapted to receive said bridge piece; means to prevent movement of said bridge piece with respect to said wedge after adjustment; and means to prevent movement of said wedges with respect to the chair and other parts of the joint; for substantially the purposes set forth.

45. A rail joint; comprising the rails; a fish bar, having a flange projecting beyond the edge of the bases of the rails, provided with spiking apertures in said projecting flange; a chair, comprising a base and arms extending upwardly and inwardly; a base plate, interlocking with the said chair, extending transversely for a portion of its length beyond the bases of the rails, provided with spiking apertures coöperating with the spiking apertures in the projecting flange of the fish bar; spikes traversing the coöperating apertures of the fish bar and base plate; an adjustable bridge piece, constructed to overlap the rail ends and be supported in such manner that the height of its upper surface may be adjusted in such relation to the rail treads as to form with the rails a continuous tread at the joint; wedges, constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails, one of the said wedges being formed with a recess of greater length than and adapted to receive said bridge piece; means to prevent movement of said bridge piece with respect to said wedge after adjustment; and means to prevent movement of said wedges with respect to the chair and other parts of the joint; for substantially the purposes set forth.

46. A rail joint; comprising the rails; a fish bar; a chair, comprising a base and arms extending upwardly and inwardly; a bridge piece, of substantially uniform section, constructed to overlap the rail ends and be supported with its upper face in such relation to the rail treads as to form with the rails a continuous tread at the joint; and wedges, constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails; for substantially the purposes set forth.

47. A rail joint; comprising the rails; a fish bar; a chair, comprising a base and arms extending upwardly and inwardly; an adjustable bridge piece, of substantially uniform section, constructed to overlap the rail ends and be supported in such manner that the height of its upper surface may be adjusted in such relation to the rail treads as to form with the rails a continuous tread at the joint; and wedges, constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails, one of the said wedges being formed with a recess of greater length than and adapted to receive said bridge piece; for substantially the purposes set forth.

48. A rail joint; comprising the rails; a fish bar; a chair, comprising a base and arms extending upwardly and inwardly; an adjustable bridge piece, of substantially uniform section, constructed to overlap the rail ends and be supported in such manner that the height of its upper surface may be adjusted in such relation to the rail treads as to form with the rails a continuous tread at the joint; wedges, constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails, one of the said wedges being formed with a recess of greater length than and adapted to receive said bridge piece, means to prevent movement of said bridge piece with respect to said wedge after adjustment; and means to prevent movement of said wedges with respect to the chair and other parts of the joint; for substantially the purposes set forth.

49. A rail joint; comprising the rails; a fish bar, having a flange projecting beyond the edges of the bases of the rails provided with spiking apertures in said projecting flange; a chair comprising a base and arms extending upwardly and inwardly; a base plate interlocking with said chair, extending transversely for a portion of its length beyond the bases of the rails and provided with spiking apertures coöperating with the spiking apertures in the fish bar; spikes traversing the said coöperating apertures in the base plate and fish bar flange; an adjustable bridge piece, of substantially uniform section, constructed to overlap the rail ends and be supported in such manner that the height of its upper surface may be adjusted in such relation to the rail treads as to form with the rails a continuous tread at the joint; wedges constructed to engage with the rails, bridge piece and chair in such manner as to secure the bridge piece in position and provide an upward pressure of the parts of the joint under the heads and lower surfaces of the bases of the rails and a downward pressure of the parts of the joint upon the upper surfaces of the bases of the rails, one of the said wedges being formed with a recess of greater length than and adapted to receive said bridge piece; means to prevent movement of said bridge piece with respect to said wedge after adjustment; and means to prevent movement of said wedges with respect to the chair and other parts of the joint; for substantially the purposes set forth.

50. A rail joint; comprising the rails; fish bars; a chair, comprising a base and arms extending upwardly and inwardly; a bridge piece constructed to overlap the rail ends and be supported with its upper face in such relation to the rail treads as to form with the rails a continuous tread at the joint; and a wedge constructed to engage with the chair, bridge piece and other parts of the joint in such manner as to retain the parts in position; for substantially the purposes set forth.

51. A rail joint; comprising the rails; fish bars; a chair, comprising a base and arms extending upwardly and inwardly; an adjustable bridge piece constructed to overlap the rail ends and be supported in such manner that the height of its upper surface may be adjusted in such relation to the rail treads as to form with the rails a continuous tread at the joint; and a wedge provided with a recess of greater length than and adapted to receive said bridge piece, constructed to engage with the chair, bridge piece and other parts of the joint in such manner as to retain the parts in position; for substantially the purposes set forth.

52. A rail joint; comprising the rails; fish bars; a chair, comprising a base and arms extending upwardly and inwardly; an adjustable bridge piece, constructed to overlap the rail ends and be supported in such manner that the height of its upper surface may be adjusted in such relation to the rail treads as to form with the rails a continuous tread at the joint; a wedge provided with a recess of greater length than and adapted to receive said bridge piece, constructed to engage with the chair, bridge piece and other parts of the joint in such manner as to retain the parts in position; means to prevent movement of said bridge piece with respect to said wedges after adjustment; and means to prevent movement of said wedges with respect to the chair and other parts of the joint; for substantially the purposes set forth.

53. A rail joint; comprising the rails; fish bars; a chair comprising a base and arms extending upwardly and inwardly; a bridge piece, of substantially uniform section, constructed to overlap the rail ends and be supported with its upper face in such relation to the rail treads as to form with the rails a continuous tread at the joint; and a wedge constructed to engage with the chair, bridge piece and other parts of the joint in such manner as to retain the parts in position; for substantially the purposes set forth.

54. A rail joint; comprising the rails; fish bars; a chair, comprising a base and arms extending upwardly and inwardly; an adjustable bridge piece, of substantially uniform section, constructed to overlap the rail ends and be supported in such manner that the height of its upper surface may be adjusted in such relations to the rail treads as to form with the rails a continuous tread at the joint; and a wedge, provided with a recess of greater length than and adapted to receive said bridge piece constructed to engage with the chair, bridge piece and other parts of the joint in such manner as to retain the parts in position; for substantially the purposes set forth.

55. A rail joint; comprising the rails; fish bars; a chair, comprising a base and arms extending upwardly and inwardly; an adjustable bridge piece, of substantially uniform section, constructed to overlap the rail ends and be supported in such manner that the height of its upper surface may be adjusted in such relation to the rail treads as to form with the rails a continuous tread at the joint; a wedge provided with a recess of greater length than and adapted to receive said bridge piece constructed to engage with the chair, bridge piece and other parts of the joint in such manner as to retain the parts in position; means to prevent movement of said bridge piece with respect to said wedge after adjustment; and means to prevent movement of the wedge with respect to the chair and other parts of the joint; for substantially the purposes set forth.

56. A rail joint; comprising the rails; fish bars; a chair, comprising a base and arms extending upwardly and inwardly supporting the rail ends; an adjustable bridge piece, of substantially uniform section, constructed to overlap the rail ends and be supported in such manner that the height of its upper surface may be adjusted in such relation to the rail treads as to form with the rails a continuous tread at the joint; a base plate interlocking with the chair, extending transversely for a portion of its length beyond the bases of the rails and provided with spiking apertures; spikes traversing the apertures in the base plate; a wedge, provided with a recess of greater length than and adapted to receive said bridge piece constructed to engage with the chair, bridge piece and other parts of the joint in such manner as to retain the parts in position; means to prevent movement of said bridge piece with respect to said wedge after adjustment; and means to prevent movement of said wedge with respect to the chair and other parts of the joint; for substantially the purposes set forth.

In testimony whereof I have signed this specification in the presence of two subscribing witnesses.

H. G. GILLMOR.

Witnesses:
H. H. BONNEMORT,
H. E. WILLIAMS.